US009150099B2

(12) United States Patent
Kishi et al.

(10) Patent No.: US 9,150,099 B2
(45) Date of Patent: Oct. 6, 2015

(54) RELIEF VALVE DEVICE

(71) Applicant: DENSO CORPORATION, Kariya, Aichi-pref. (JP)

(72) Inventors: Ryoyu Kishi, Kariya (JP); Shinji Sugihara, Mizuho (KR)

(73) Assignee: DENSO CORPORATION, Kariya (JP)

( * ) Notice: Subject to any disclaimer, the term of this patent is extended or adjusted under 35 U.S.C. 154(b) by 299 days.

(21) Appl. No.: 13/912,459

(22) Filed: Jun. 7, 2013

(65) Prior Publication Data

US 2013/0327424 A1 Dec. 12, 2013

(30) Foreign Application Priority Data

Jun. 11, 2012 (JP) ................................. 2012-131854

(51) Int. Cl.

| F16K 17/26 | (2006.01) |
| B60K 15/035 | (2006.01) |
| F16K 17/196 | (2006.01) |
| F16K 24/00 | (2006.01) |
| F16K 31/06 | (2006.01) |

(52) U.S. Cl.
CPC ......... *B60K 15/03519* (2013.01); *F16K 17/196* (2013.01); *F16K 24/00* (2013.01); *F16K 31/0693* (2013.01); *F16K 31/0696* (2013.01); *Y10T 137/7837* (2015.04)

(58) Field of Classification Search
CPC . B60K 15/03519; F16K 24/00; F16K 17/196; F16K 31/0696; F16K 31/0693; F16K 24/02; Y10T 137/7837; Y10T 137/7771; Y10T 137/7772; Y10T 137/7773; Y10T 137/7777; Y10T 137/7779
See application file for complete search history.

(56) References Cited

U.S. PATENT DOCUMENTS

| 4,846,317 A | 7/1989 | Hudgens |
| 5,165,445 A * | 11/1992 | Vertanen ................... 137/493.6 |
| 5,749,347 A * | 5/1998 | Torii et al. ..................... 123/516 |
| 2005/0217734 A1 | 10/2005 | Takakura |
| 2009/0236350 A1 | 9/2009 | Miura |
| 2010/0269921 A1 | 10/2010 | Pifer et al. |
| 2012/0047999 A1* | 3/2012 | Itoh et al. .......................... 73/40 |
| 2012/0195780 A1* | 8/2012 | Matsumoto et al. ........... 417/559 |
| 2012/0251365 A1* | 10/2012 | Ono ................................ 417/440 |
| 2013/0008537 A1 | 1/2013 | Onodera et al. |

FOREIGN PATENT DOCUMENTS

| JP | 02-062438 | 3/1990 |
| JP | 03-082355 | 4/1991 |
| JP | 2007-071233 | 3/2007 |

* cited by examiner

*Primary Examiner* — Jessica Cahill
(74) *Attorney, Agent, or Firm* — Nixon & Vanderhye P.C.

(57) ABSTRACT

In a relief valve device, a positive-pressure relief valve opens a first valve port when pressure in a pressure chamber increases to a pressure that is equal to or higher than positive-pressure side valve-opening pressure. A negative-pressure relief valve opens a second valve port when pressure in the pressure chamber decreases to a pressure that is equal to or lower than negative-pressure side valve-opening pressure. When the positive-pressure relief valve is closed, a positive valve-opening pressure adjustment unit adjusts a set load of a positive-pressure spring according to an amount of an adjustment screw screwed in the pedestal plate. When the negative-pressure relief valve is closed, a negative valve-opening pressure adjustment unit adjusts a set load of the negative-pressure spring via the valve plate through forward or backward movement of the pedestal plate relative to a housing main body.

6 Claims, 9 Drawing Sheets

RELIEF VALVE DEVICE

CROSS REFERENCE TO RELATED APPLICATION

This application is based on Japanese Patent Application No. 2012-131854 filed on Jun. 11, 2012, the disclosure of which is incorporated herein by reference.

TECHNICAL FIELD

The present disclosure relates to a relief valve device for maintaining a pressure of a space in a proper pressure range. For example, the present disclosure relates to a relief valve device that is used for a fuel tank seal valve.

BACKGROUND

Conventionally, for a fuel tank seal valve, there is provided a valve having a positive-pressure relief valve and negative-pressure relief valve for maintaining a pressure in a fuel tank at a proper pressure (see US 2010/0269921A1). The pressure in the fuel tank may be a positive pressure as a result of vaporization of fuel, or a negative pressure as a result of devolatilization of the vaporized fuel. Accordingly, for the purpose of protection of the fuel tank, the positive-pressure relief valve and negative-pressure relief valve are provided for keeping the pressure in the fuel tank at the proper pressure.

The positive-pressure relief valve and negative-pressure relief valve are configured to urge their valving elements in a valve-closing direction by their relief springs, respectively. Therefore, a valve-opening pressure (i.e., relief pressure) is determined by a set load of the relief spring. However, because the relief spring has a tolerance, the set load varies despite the same set length, so that a target valve-opening pressure may not be obtained. Accordingly, to set the valve-opening pressure at the target pressure, it becomes necessary to provide an adjustment mechanism for adjusting the set load of the relief spring.

However, according to the technology described in US 2010/0269921A1, a spring receiving part that receives the relief spring of the positive-pressure relief valve, and a spring receiving part that receives the relief spring of the negative-pressure relief valve are positioned on the opposite sides of a housing. Accordingly, when a mechanism for adjusting the position of the spring receiving part is employed for the mechanism for adjusting the relief spring, adjustment operations of the respective relief valves need to be performed from different directions. As a result, the adjustment operations become complicated. Specifically, after the adjustment of one relief spring, the other relief spring needs to be adjusted with the housing inverted.

SUMMARY

The present disclosure addresses at least one of the above issues.

According to the present disclosure, there is provided a relief valve device including a housing, a positive-pressure relief valve, a negative-pressure relief valve, a positive valve-opening pressure adjustment unit, and a negative valve-opening pressure adjustment unit. The housing includes a pressure chamber, a housing main body, a valve plate, and a pedestal plate. The pressure chamber communicates with a pressure container. The housing main body opens on its one end side. The valve plate is disposed in the housing main body to define one side of the pressure chamber and includes a first valve port and a second valve port, which communicate with the pressure chamber. The pedestal plate is disposed further on the one end side of the housing main body than the valve plate. The positive-pressure relief valve is configured to open when pressure in the pressure chamber increases to a pressure that is equal to or higher than a valve-opening pressure on a positive-pressure side. The positive-pressure relief valve is disposed on an opposite side of the valve plate from the pressure chamber. The positive-pressure relief valve includes a positive-pressure spring that is configured to set the valve-opening pressure on the positive-pressure side. The positive-pressure relief valve opens the first valve port when the pressure in the pressure chamber increases to the pressure that is equal to or higher than the valve-opening pressure on the positive-pressure side. The negative-pressure relief valve is configured to open when the pressure in the pressure chamber decreases to a pressure that is equal to or lower than a valve-opening pressure on a negative-pressure side. The negative-pressure relief valve is disposed on the pressure chamber-side of the valve plate. The negative-pressure relief valve includes a negative-pressure spring that is configured to set the valve-opening pressure on the negative-pressure side. The pedestal plate is attached to the housing main body to be movable forward or backward relative to the housing main body. The valve plate is disposed to be movable in a direction of expansion or contraction of the negative-pressure spring integrally with the pedestal plate or in accordance with the forward or backward movement of the pedestal plate. The negative-pressure relief valve opens the second valve port when the pressure in the pressure chamber decreases to the pressure that is equal to or lower than the valve-opening pressure on the negative-pressure side. The positive valve-opening pressure adjustment unit is configured to adjust the valve-opening pressure of the positive-pressure relief valve and includes an adjustment screw which is screw-joined to the pedestal plate. When the positive-pressure relief valve is closed, the positive valve-opening pressure adjustment unit adjusts a set load of the positive-pressure spring according to an amount of the adjustment screw screwed in the pedestal plate. The negative valve-opening pressure adjustment unit is configured to adjust the valve-opening pressure of the negative-pressure relief valve. When the negative-pressure relief valve is closed, the negative valve-opening pressure adjustment unit adjusts a set load of the negative-pressure spring via the valve plate through the forward or backward movement of the pedestal plate relative to the housing main body.

According to the present disclosure, there is also provided a relief valve device including a housing, a positive-pressure relief valve, a negative-pressure relief valve, a positive valve-opening pressure adjustment unit, and a negative valve-opening pressure adjustment unit. The housing includes a pressure chamber, a housing main body, a valve plate, and a pedestal plate. The pressure chamber communicates with a pressure container. The housing main body opens on its one end side. The valve plate is disposed in the housing main body to define one side of the pressure chamber and includes a first valve port and a second valve port, which communicate with the pressure chamber. The pedestal plate is disposed further on the one end side of the housing main body than the valve plate. The positive-pressure relief valve is configured to open when pressure in the pressure chamber increases to a pressure that is equal to or higher than a valve-opening pressure on a positive-pressure side. The positive-pressure relief valve is disposed on an opposite side of the valve plate from the pressure chamber. The positive-pressure relief valve includes a positive-pressure spring that is configured to set the valve-opening pressure on the positive-pressure side. The positive-pressure relief valve opens the first valve port when the pressure in the pressure chamber increases to the pressure that is equal to or higher than the valve-opening pressure on the positive-pressure side. The negative-pressure relief valve is configured to open when the pressure in the pressure chamber decreases to a pressure that is equal to or lower than a valve-opening pressure on a negative-pressure side. The negative-pressure relief valve is disposed on the pressure chamber-side of the valve plate. The negative-pressure relief valve includes a negative-pressure spring that is configured to set the valve-opening pressure on the negative-pressure side. The pedestal plate is attached to the housing main body to be movable forward or backward relative to the housing main body. The valve plate is disposed to be movable in a direction of expansion or contraction of the positive-pressure spring integrally with the pedestal plate or in accordance with the forward or backward movement of the pedestal plate. The negative-pressure relief valve opens the second valve port when the pressure in the pressure chamber decreases to the pressure that is equal to or lower than the valve-opening pressure on the negative-pressure side. The positive valve-opening pressure adjustment unit is configured to adjust the valve-opening pressure of the positive-pressure relief valve. When the positive-pressure relief valve is closed, the positive valve-opening pressure adjustment unit adjusts a set load of the positive-pressure spring via the valve plate through the forward or backward movement of the pedestal plate relative to the housing main body. The negative valve-opening pressure adjustment unit is configured to adjust the valve-opening pressure of the negative-pressure relief valve and includes an adjustment screw which is screw-joined to the pedestal plate. When the negative-pressure relief valve is closed, the negative valve-opening pressure adjustment unit adjusts a set load of the negative-pressure spring according to an amount of the adjustment screw screwed in the pedestal plate.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be explained in detail in the following description.

First Embodiment

A configuration of a relief valve device 1 of a first embodiment will be described with reference to FIGS. 1 to 5. The relief valve device 1 of the present embodiment is used, for example, in a tank seal valve 2 as an evaporated fuel transpiration preventive device.

Figure 1:
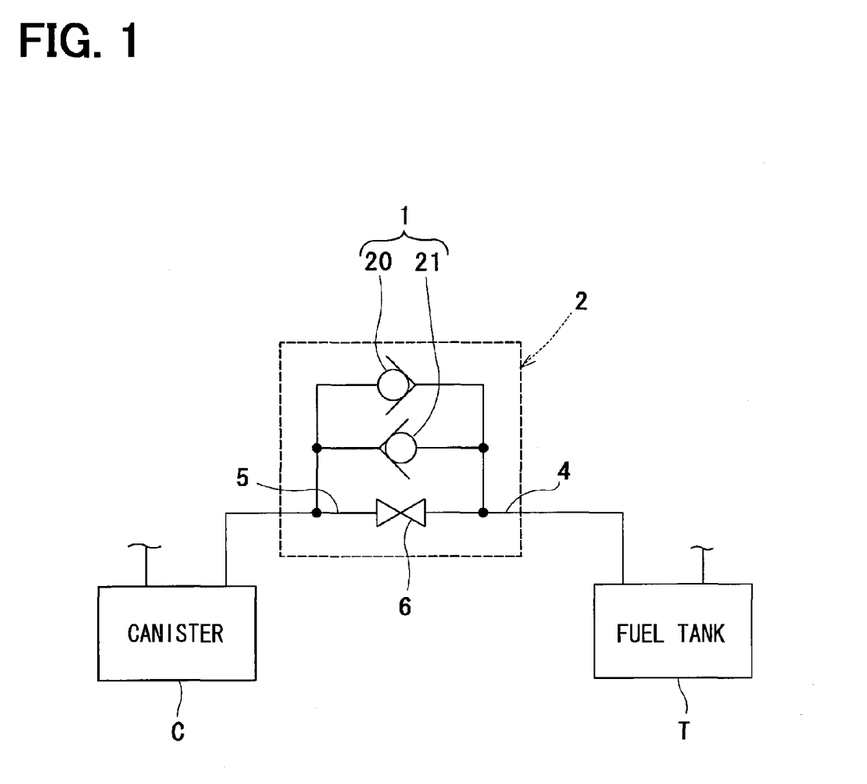
FIG. 1 is a schematic diagram illustrating a tank seal valve to which a relief valve device is applied in accordance with a first embodiment.

As illustrated in FIG. 1, the tank seal valve 2 is connected to a halfway part of a pipe communicating between a fuel tank (pressure container) T for storing fuel such as gasoline, and a canister C for adsorbing the vaporized fuel.

The tank seal valve 2 includes a first port 4 connected to the fuel tank T, a second port 5 connected to the canister C, an electromagnetic valve 6 that opens or closes a passage between the first port 4 and the second port 5, and the relief valve device 1 that opens or closes the passage between the first port 4 and the second port 5 in accordance with a pressure condition in the fuel tank T.

Figure 2:
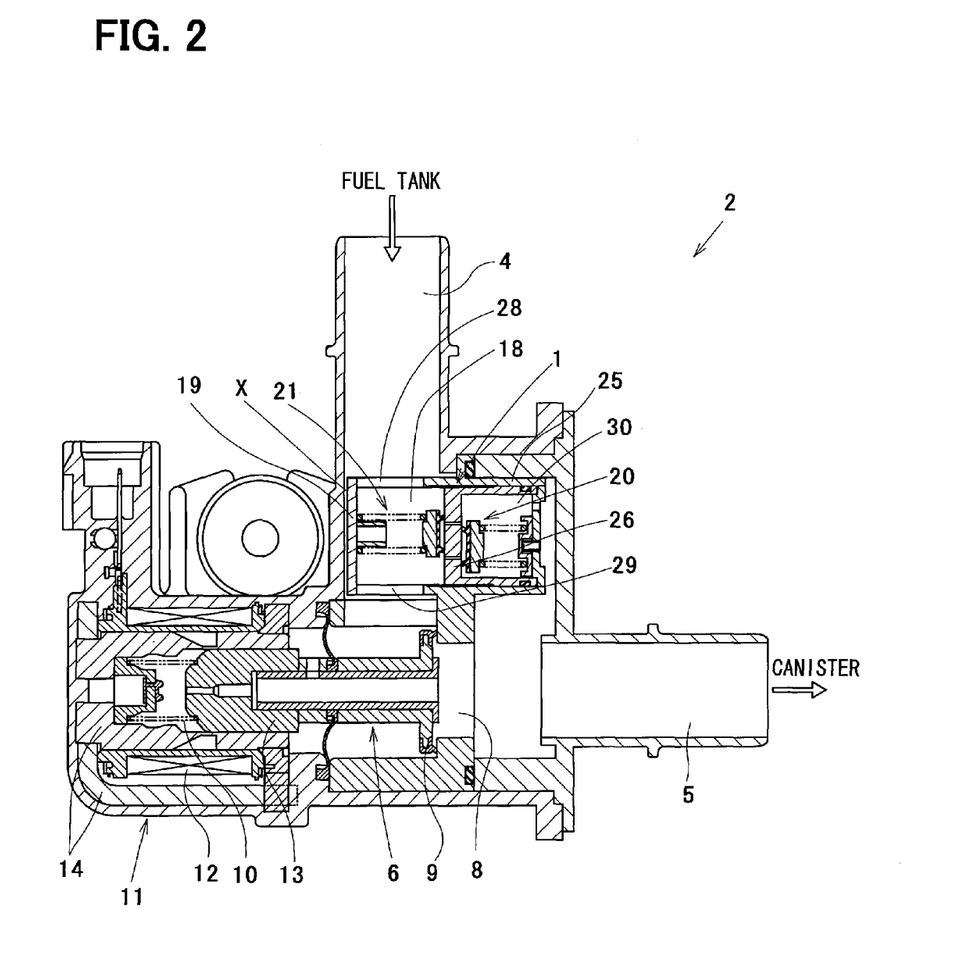
FIG. 2 is a diagram illustrating an entire configuration of the tank seal valve of the first embodiment.

The electromagnetic valve 6 includes a valving element 9 that opens or closes a valve hole 8 provided between the first port 4 and the second port 5, a return spring 10 that urges the valving element 9 in a valve-closing direction, and an electromagnetic actuator 11 for driving the valving element 9 against urging force of the return spring 10. The electromagnetic actuator 11 includes, for example, a coil 12 that generates magnetic force upon its energization, a mover 13 that is displaced integrally with the valving element 9, and a stator 14 that magnetically attracts the mover 13 by the magnetic force generated by the coil 12.

The relief valve device 1 includes a housing 19 that defines a pressure chamber 18 communicating with the first port 4; a positive-pressure relief valve 20 that is opened when a pressure in the pressure chamber 18 increases to a positive-pressure side valve-opening pressure or higher; a negative-pressure relief valve 21 that is opened when the pressure in the pressure chamber 18 is reduced to a negative-pressure side valve-opening pressure or lower; a positive valve-opening pressure adjustment unit 22 that adjusts the valve-opening pressure of the positive-pressure relief valve 20; and a negative valve-opening pressure adjustment unit 23 that adjusts the valve-opening pressure of the negative-pressure relief valve 21.

The housing 19 includes a housing main body 25 which has a cylindrical shape having a bottom and one end side of which opens; and a valve plate 26 that is disposed in this housing main body 25 to define a part of the pressure chamber 18. In the present embodiment, the housing 19 is attached such that the pressure chamber 18 is located on the fuel-tank side of the valve hole 8 which is opened or closed by the electromagnetic valve 6. The housing 19 includes an opening 28 that communicates between the first port 4 and the pressure chamber 18, and an opening 29.

The opening 28 opens on the first port side of the housing 19, and the first port 4 and the pressure chamber 18 communicate through the opening 28. The opening 29 opens to communicate with a space on the first port side of the valve hole 8. The pressure chamber 18 and the first port 4 communicate through a clearance X between an inner peripheral surface of a pipe, which defines the first port 4, and the housing 19, and through the opening 29.

A space 30, which communicates with the second port 5, is formed on an opposite side of the valve plate 26 from the pressure chamber 18. A first valve port 31 and a second valve port 32 that communicate between the pressure chamber 18 and the space 30 are provided for the valve plate 26. In the present embodiment, the first valve port 31 and second valve port 32 are formed as holes passing through the valve plate 26.

The positive-pressure relief valve 20 is located on the opposite side of the valve plate 26 from the pressure chamber 18. The relief valve 20 includes a first valving element 33 that opens or closes the first valve port 31, and a positive-pressure spring 34 that urges the first valving element 33 in its closing direction. One end of the positive-pressure spring 34 is engaged with a spring receiving part 33a formed on the first valving element 33. The other end of the positive-pressure spring 34 is engaged with a spring receiving member 35. The valve-opening pressure on the positive-pressure side is set by the positive-pressure spring 34. The first valve port 31 is opened when the pressure in the pressure chamber 18 increases to this positive-pressure side valve-opening pressure or higher.

The negative-pressure relief valve 21 includes a second valving element 36 that opens or closes the second valve port 32, and a negative-pressure spring 37 that urges the second valving element 36 in its closing direction. One end of the negative-pressure spring 37 is engaged with a spring receiving part 36a formed on the second valving element 36. The other end of the negative-pressure spring 37 is engaged with a bottom part of the housing main body 25. The valve-opening pressure on the negative-pressure side is set by the negative-pressure spring 37. The second valve port 32 is opened when the pressure in the pressure chamber 18 is reduced to this negative-pressure side valve-opening pressure or lower.

The housing 19 includes a pedestal plate 40 that is located further on one end side of the housing main body 25 than the valve plate 26. This pedestal plate 40 is attached to the housing main body 25 to be capable of reciprocating (moving forward or backward) relative to the housing main body 25, i.e., the pedestal plate 40 can move toward or away from the housing main body 25. The valve plate 26 is provided to be movable integrally with the pedestal plate 40 in expansion and contraction directions of the negative-pressure spring 37. The positive valve-opening pressure adjustment unit 22 includes an adjustment screw 41 that is screwed to the pedestal plate 40. The adjustment unit 22 adjusts a set load of the positive-pressure spring 34 in accordance with the amount of the adjustment screw 41 screwed in the pedestal plate 40 at time of closing of the positive-pressure relief valve 20. The negative valve-opening pressure adjustment unit 23 adjusts a set load of the negative-pressure spring 37 via the valve plate 26 by reciprocating the pedestal plate 40 relative to the housing main body 25 at time of closing of the negative-pressure relief valve 21.

Figure 3:
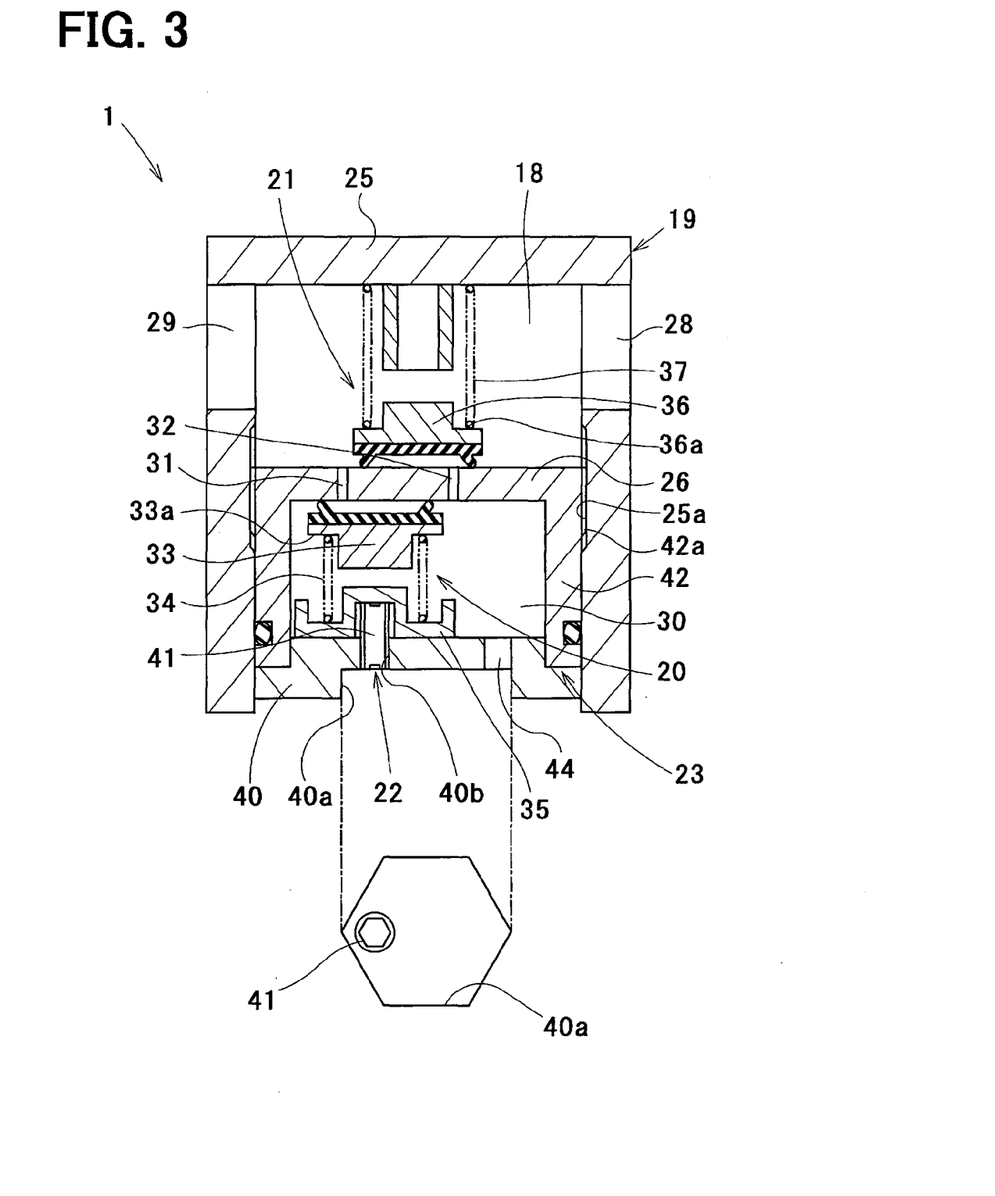
FIG. 3 is a diagram illustrating an entire configuration of the relief valve device of the first embodiment.

As illustrated in FIG. 3, a cylindrical part 42 extending cylindrically integrally with the valve plate 26 is provided on one end side of the valve plate 26. The pedestal plate 40 is fixed to an end part of the cylindrical part 42 on its opposite side from the valve plate 26 by, for example, welding. The positive-pressure relief valve 20 is arranged in the space 30 between the valve plate 26 and the pedestal plate 40. The spring receiving member 35 is disposed between the pedestal plate 40 and the positive-pressure spring 34. A communicating passage 44 that communicates between the space 30 and the second port 5 is provided for the pedestal plate 40.

A male screw part 42a is formed on an outer periphery of the cylindrical part 42. The male screw part 42a is screwed into a female screw part 25a which is formed on an inner peripheral surface of the housing main body 25. A hexagonal recess 40a is formed on an end face of the pedestal plate 40 on the opposite side from the valve plate 26. This hexagonal recess 40a is used for rotating the pedestal plate 40 by a tool such as a hexagonal wrench. Accordingly, by rotating the pedestal plate 40, the cylindrical part 42 is screwed integrally with the plate 40, so that the pedestal plate 40 and the valve plate 26 are reciprocated relative to the housing main body 25. As a result, a distance between the valve plate 26 and the bottom part of the housing main body 25 can be adjusted. Thus, through adjustment of the set load of the negative-pressure spring 37, the valve-opening pressure of the negative-pressure relief valve 21 can be adjusted.

A screw hole 40b passing through a bottom part of the hexagonal recess 40a into the space 30 is provided for the pedestal plate 40. The adjustment screw 41 is screwed into this screw hole 40b to be capable of reciprocating through the screw hole 40b. In the present embodiment, for example, a hexagon socket screw is used for the adjustment screw 41.

The screw hole 40b and the adjustment screw 41 are provided at a position that can be in contact with the spring receiving member 35. The spring receiving member 35 is reciprocated according to the amount of the adjustment screw 41 screwed in. Accordingly, the positive-pressure spring 34 can be expanded or contracted. As a result, the set load of the positive-pressure spring 34 is adjusted in accordance with the amount of the adjustment screw 41 screwed in the pedestal plate 40. Consequently, the valve-opening pressure of the positive-pressure relief valve 20 can be adjusted.

Figure 4:
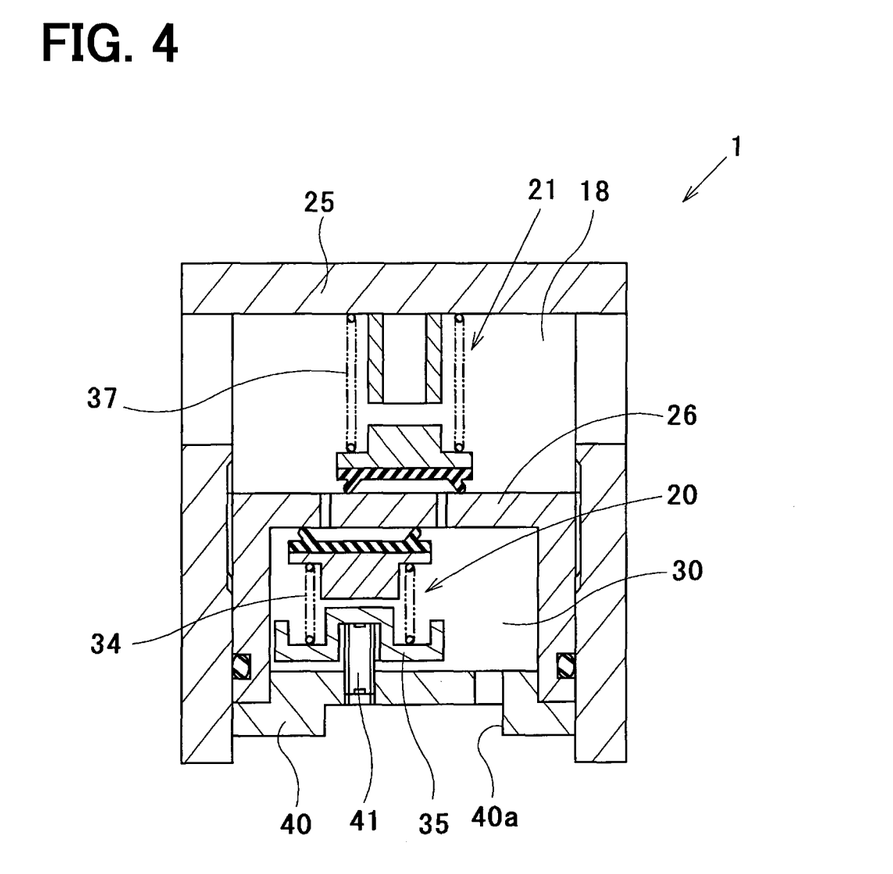
FIG. 4 is a diagram illustrating adjustment of valve-opening pressure of the relief valve device of the first embodiment.

Adjustment operation of the valve-opening pressure of the relief valve device 1 of the present embodiment will be described below. In the case of adjustment of the valve-opening pressure of the positive-pressure relief valve 20, the adjustment screw 41 is turned from the pedestal plate 40-side of the housing 19 when the positive-pressure relief valve 20 is in its closed state. In the case of adjustment of the valve-opening pressure of the negative-pressure relief valve 21, the pedestal plate 40 is rotated via the hexagonal recess 40a when the negative-pressure relief valve 21 is in its closed state. FIG. 4 illustrates a state after the valve plate 26 and the spring receiving member 35 have been reciprocated through this adjustment operation from a state in FIG. 3.

Figure 5:
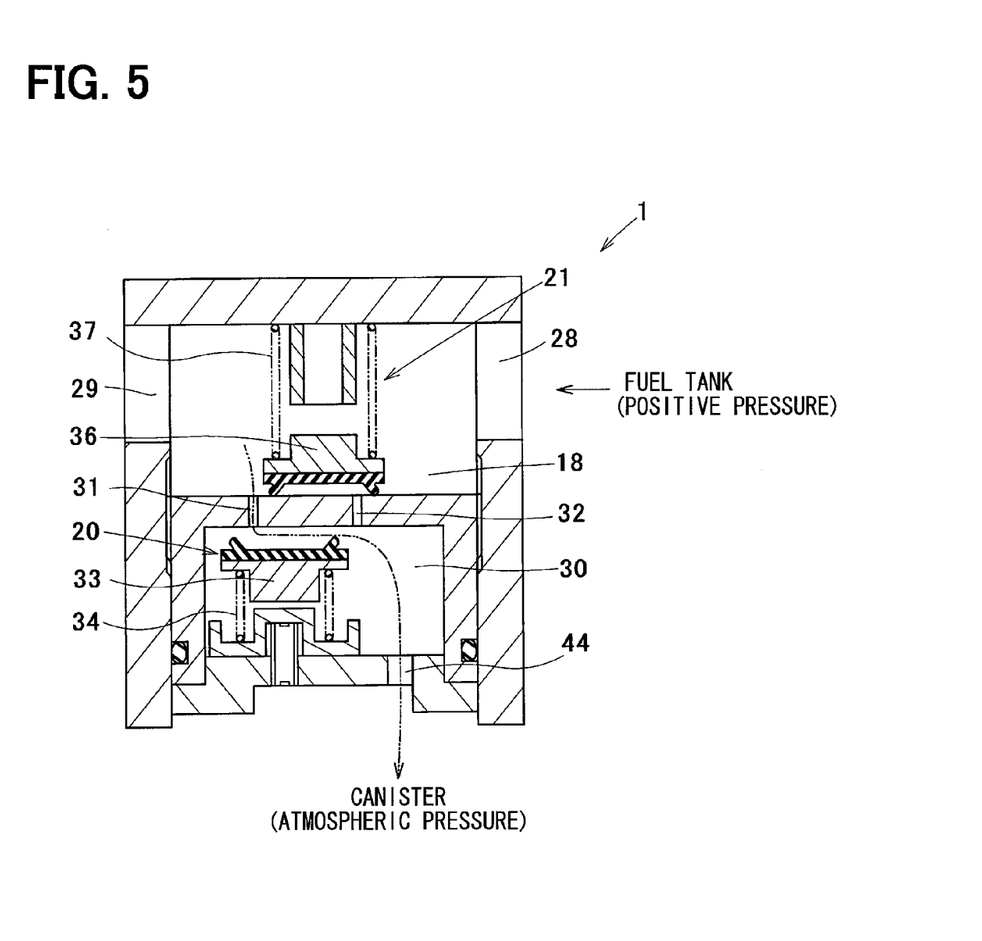
FIG. 5 is a diagram illustrating the relief valve device at time of opening of a positive-pressure relief valve according to the first embodiment.
Figure 6:
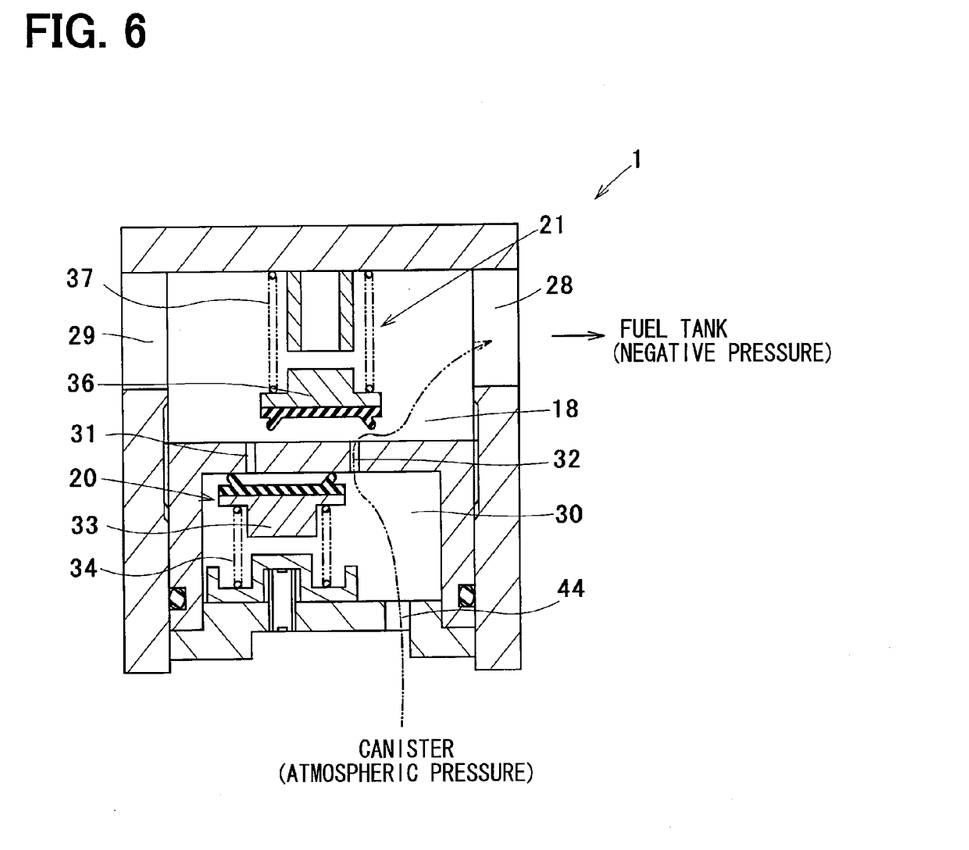
FIG. 6 is a diagram illustrating the relief valve device at time of opening of a negative-pressure relief valve according to the first embodiment.

Operation of the relief valve device 1 will be described below. The operation of the positive-pressure relief valve 20 is illustrated in FIG. 5. The operation of the negative-pressure relief valve 21 is illustrated in FIG. 6. When a positive pressure that is the valve-opening pressure of the positive-pressure relief valve 20 or higher is produced in the fuel tank T, the first valving element 33 opens the first valve port 31. Accordingly, the fluid flows from the first port 4 (fuel tank side) through the openings 28, 29, the pressure chamber 18, the first valve port 31, the space 30, and the communicating passage 44 toward the second port 5 (canister side). As a result, the pressure in the fuel tank T can be reduced. When a negative pressure that is the valve-opening pressure of the negative-pressure relief valve 21 or lower is produced in the fuel tank T, the second valving element 36 opens the second valve port 32. Accordingly, the fluid is guided from the second port 5 (canister side) through the communicating passage 44, the space 30, the second valve port 32, the pressure chamber 18, and the openings 28, 29 toward the first port 4 (fuel tank side). As a result, the pressure in the fuel tank T can be increased.

Operation and effects of the first embodiment will be described below. According to the present embodiment, adjustments of the positive valve-opening pressure and the negative valve-opening pressure can be made from the pedestal plate 40-side. As a consequence, in the relief valve device 1 including the positive-pressure relief valve 20 and the negative-pressure relief valve 21, the operation of adjustment of the valve-opening pressure of each relief valve can be facilitated.

Second Embodiment

Figure 7:
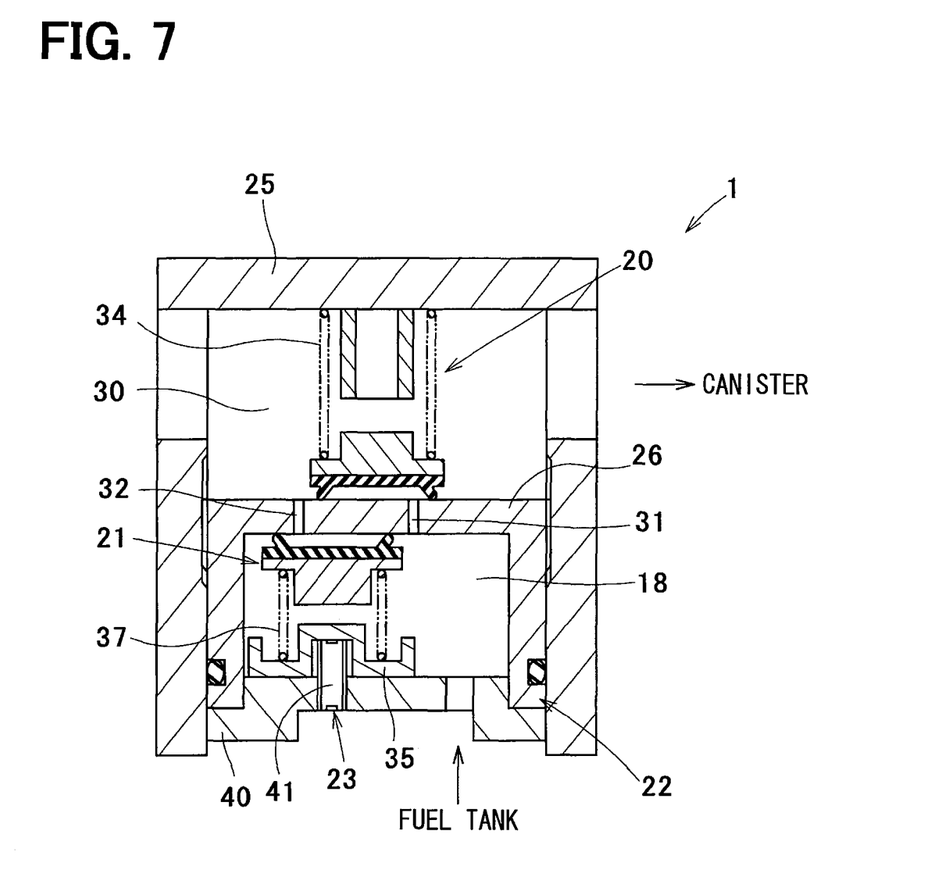
FIG. 7 is a diagram illustrating an entire configuration of a relief valve device in accordance with a second embodiment.

A second embodiment, mainly its differences from the first embodiment, will be described in reference to FIG. 7. The same reference numerals as in the first embodiment indicate corresponding configurations for referring to the preceding descriptions. In the present embodiment, the openings 28, 29 of the first embodiment communicate with a second port 5 (canister side), and a communicating passage 44 communicates with a first port 4 (tank side). Accordingly, a pressure chamber 18 is a space that is located on a pedestal plate 40-side of a valve plate 26; a relief valve on the pedestal plate 40-side of the valve plate 26 is a negative-pressure relief valve 21; and a relief valve on an opposite side of the valve plate 26 from the pedestal plate 40 is a positive-pressure relief valve 20. Therefore, a spring receiving member 35 is in engagement with a negative-pressure spring 37; and a bottom part of a housing main body 25 is in engagement with a positive-pressure spring 34.

Adjustment operation of valve-opening pressure of a relief valve device 1 of the present embodiment will be described below. In the case of adjustment of valve-opening pressure of the positive-pressure relief valve 20, the pedestal plate 40 is rotated via a hexagonal recess 40a when the positive-pressure relief valve 20 is in its closed state. In the case of adjustment of valve-opening pressure of the negative-pressure relief valve 21, an adjustment screw 41 is turned from the pedestal plate 40-side of the housing 19 when the negative-pressure relief valve 21 is in its closed state. In the present embodiment as well, operation and effects similar to the first embodiment can be produced. Although reference numerals are partly different, FIG. 4 illustrates a state after the valve plate 26 and the spring receiving member 35 have been reciprocated through this adjustment operation from a state in FIG. 7.

Third Embodiment

A third embodiment will be described in reference to FIG. 8 with a focus on differences from the first embodiment. The same reference numerals as in the first embodiment indicate corresponding configurations for referring to the preceding descriptions.

In the present embodiment, a valve plate 26 serves as a valving element of a negative-pressure relief valve 21. Specifically, a second valve port 32 is configured as a clearance that is formed between an inner peripheral surface of a housing main body 25 and an outer peripheral surface of the valve plate 26 and that communicates with a pressure chamber 18. In the negative-pressure relief valve 21, the valve plate 26 functions as a second valving element 36 that opens or closes the second valve port 32; and the valve plate 26 is urged in its closing direction by a negative-pressure spring 37.

Figure 8:
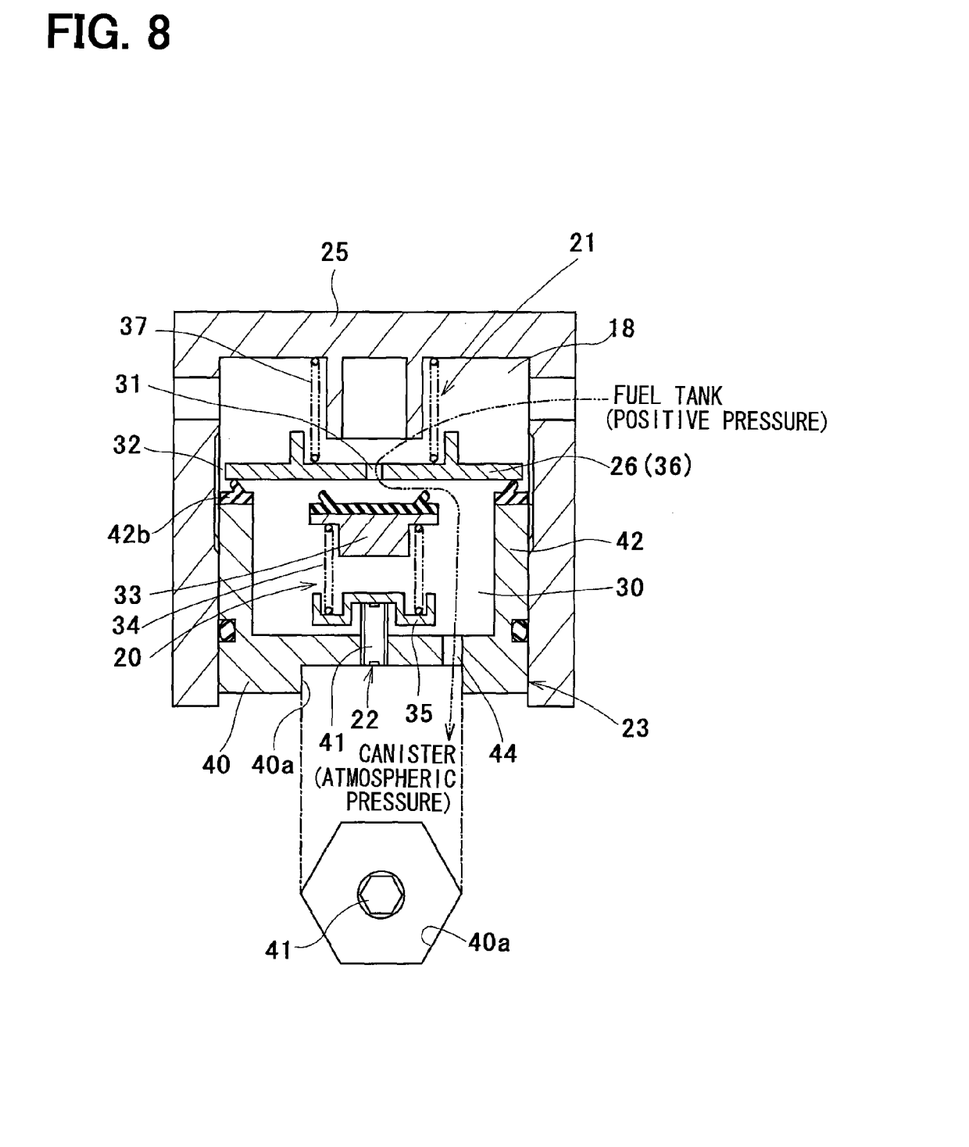
FIG. 8 is a diagram illustrating a relief valve device at time of opening of a positive-pressure relief valve in accordance with a third embodiment.

As illustrated in FIG. 8, in the present embodiment, the valve plate 26 and a cylindrical part 42 are separately provided; and the cylindrical part 42 and a pedestal plate 40 are integrally provided. Accordingly, the cylindrical part 42 and the pedestal plate 40 constitute a member having a cylindrical shape having a bottom that opens on the valve plate 26-side. The valve plate 26 is arranged at the opening of this member. An outer diameter of the valve plate 26 is smaller than an inner diameter of the housing main body 25. The clearance is formed between the outer periphery of the valve plate 26 and the inner periphery of the housing main body 25, and this clearance serves as the second valve port 32.

A seal part 42b is provided at the end portion of the cylindrical part 42 on the valve plate 26-side. The valve plate 26 can be engaged with or disengaged from this seal part 42b. A state in which the valve plate 26 is engaged with the seal part 42b by urging force of the negative-pressure spring 37 is a closed state of the second valve port 32. A state in which the valve plate 26 is disengaged from the seal part 42b is an open state of the second valve port 32.

Figure 9:
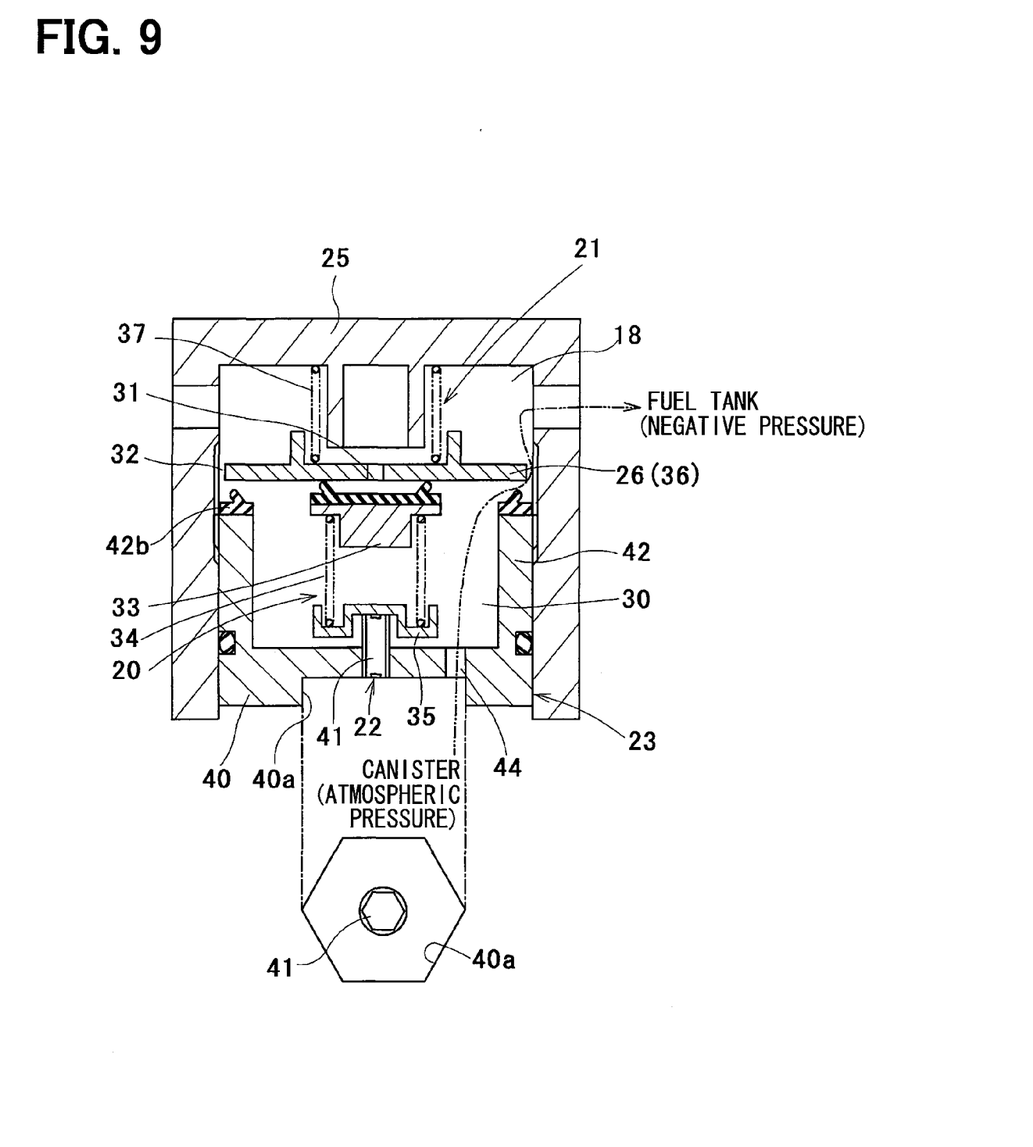
FIG. 9 is a diagram illustrating the relief valve device at time of opening of a negative-pressure relief valve according to the third embodiment.

Operation of a relief valve device 1 will be described below. The operation of a positive-pressure relief valve 20 is illustrated in FIG. 8. The operation of a negative-pressure relief valve 21 is illustrated in FIG. 9. When a positive pressure that is valve-opening pressure of the positive-pressure relief valve 20 or higher is produced in a fuel tank T, a first valving element 33 opens a first valve port 31. Accordingly, the fluid flows from a first port 4, through openings 28, 29, the pressure chamber 18, the first valve port 31, a space 30, and a communicating passage 44 toward a second port 5 (canister side). As a result, the pressure in the fuel tank T can be reduced. When a negative pressure that is valve-opening pressure of the negative-pressure relief valve 21 or lower is produced in the fuel tank T, the valve plate 26 which is the second valving element 36 opens the second valve port 32. Accordingly, the fluid is guided from the second port 5, through the communicating passage 44, the space 30, the second valve port 32, the pressure chamber 18, and the openings 28, 29 toward the first port 4. As a result, the pressure in the fuel tank T can be increased.

In the present embodiment as well, the valve-opening pressures of the positive-pressure relief valve 20 and the negative-pressure relief valve 21 can be adjusted through the similar operation to the first embodiment. Accordingly, operation and effects similar to the first embodiment can be produced. In the present embodiment, the valve plate 26 and the pedestal plate 40 are not fixed together. Thus, the valve plate 26 is provided to be movable in accordance with the reciprocation of the pedestal plate 40. Specifically, at the time of operation to displace the valve plate 26 toward the pedestal plate 40, the valve plate 26 moves in accordance with the reciprocation of the pedestal plate 40 with the valve plate 26 in contact with the cylindrical part 42 by the urging force of the negative-pressure spring 37. In the present embodiment, the valve plate 26 concurrently serves as the valving element of the negative-pressure relief valve 21. As a result, the number of components of the relief valve device 1 can be reduced.

In the present embodiment, the openings 28, 29 may communicate with the second port 5 (canister side); and the communicating passage 44 may communicate with the first port 4 (tank side). In that case, the valve plate 26 serves also as the valving element of the positive-pressure relief valve 20.

Modifications of the above embodiments will be described below. The relief valve device 1 of the embodiments is used for the tank seal valve 2. Alternatively, the relief valve device 1 can be applied to an apparatus that requires the positive-pressure relief valve 20 and the negative-pressure relief valve 21.

To sum up, the relief valve device 1 of the above embodiments can be described as follows.

A relief valve device 1 includes a housing 19, a positive-pressure relief valve 20, a negative-pressure relief valve 21, a positive valve-opening pressure adjustment unit 22, and a negative valve-opening pressure adjustment unit 23. The housing 19 includes a pressure chamber 18, a housing main body 25, a valve plate 26, and a pedestal plate 40. The pressure chamber 18 communicates with a pressure container T.

The housing main body 25 opens on its one end side. The valve plate 26 is disposed in the housing main body 25 to define one side of the pressure chamber 18 and includes a first valve port 31 and a second valve port 32, which communicate with the pressure chamber 18. The pedestal plate 40 is disposed further on the one end side of the housing main body 25 than the valve plate 26. The positive-pressure relief valve 20 is configured to open when pressure in the pressure chamber 18 increases to a pressure that is equal to or higher than a valve-opening pressure on a positive-pressure side. The positive-pressure relief valve 20 is disposed on an opposite side of the valve plate 26 from the pressure chamber 18. The positive-pressure relief valve 20 includes a positive-pressure spring 34 that is configured to set the valve-opening pressure on the positive-pressure side. The positive-pressure relief valve 20 opens the first valve port 31 when the pressure in the pressure chamber 18 increases to the pressure that is equal to or higher than the valve-opening pressure on the positive-pressure side. The negative-pressure relief valve 21 is configured to open when the pressure in the pressure chamber 18 decreases to a pressure that is equal to or lower than a valve-opening pressure on a negative-pressure side. The negative-pressure relief valve 21 is disposed on the pressure chamber 18-side of the valve plate 26. The negative-pressure relief valve 21 includes a negative-pressure spring 37 that is configured to set the valve-opening pressure on the negative-pressure side. The pedestal plate 40 is attached to the housing main body 25 to be movable forward or backward relative to the housing main body 25. The valve plate 26 is disposed to be movable in a direction of expansion or contraction of the negative-pressure spring 37 integrally with the pedestal plate 40 or in accordance with the forward or backward movement of the pedestal plate 40. The negative-pressure relief valve 21 opens the second valve port 32 when the pressure in the pressure chamber 18 decreases to the pressure that is equal to or lower than the valve-opening pressure on the negative-pressure side. The positive valve-opening pressure adjustment unit 22 is configured to adjust the valve-opening pressure of the positive-pressure relief valve 20 and includes an adjustment screw 41 which is screw-joined to the pedestal plate 40. When the positive-pressure relief valve 20 is closed, the positive valve-opening pressure adjustment unit 22 adjusts a set load of the positive-pressure spring 34 according to an amount of the adjustment screw 41 screwed in the pedestal plate 40. The negative valve-opening pressure adjustment unit 23 is configured to adjust the valve-opening pressure of the negative-pressure relief valve 21. When the negative-pressure relief valve 21 is closed, the negative valve-opening pressure adjustment unit 23 adjusts a set load of the negative-pressure spring 37 via the valve plate 26 through the forward or backward movement of the pedestal plate 40 relative to the housing main body 25.

A relief valve device 1 includes a housing 19, a positive-pressure relief valve 20, a negative-pressure relief valve 21, a positive valve-opening pressure adjustment unit 22, and a negative valve-opening pressure adjustment unit 23. The housing 19 includes a pressure chamber 18, a housing main body 25, a valve plate 26, and a pedestal plate 40. The pressure chamber 18 communicates with a pressure container T. The housing main body 25 opens on its one end side. The valve plate 26 is disposed in the housing main body 25 to define one side of the pressure chamber 18 and includes a first valve port 31 and a second valve port 32, which communicate with the pressure chamber 18. The pedestal plate 40 is disposed further on the one end side of the housing main body 25 than the valve plate 26. The positive-pressure relief valve 20 is configured to open when pressure in the pressure chamber 18 increases to a pressure that is equal to or higher than a valve-opening pressure on a positive-pressure side. The positive-pressure relief valve 20 is disposed on an opposite side of the valve plate 26 from the pressure chamber 18. The positive-pressure relief valve 20 includes a positive-pressure spring 34 that is configured to set the valve-opening pressure on the positive-pressure side. The positive-pressure relief valve 20 opens the first valve port 31 when the pressure in the pressure chamber 18 increases to the pressure that is equal to or higher than the valve-opening pressure on the positive-pressure side. The negative-pressure relief valve 21 is configured to open when the pressure in the pressure chamber 18 decreases to a pressure that is equal to or lower than a valve-opening pressure on a negative-pressure side. The negative-pressure relief valve 21 is disposed on the pressure chamber 18-side of the valve plate 26. The negative-pressure relief valve 21 includes a negative-pressure spring 37 that is configured to set the valve-opening pressure on the negative-pressure side. The pedestal plate 40 is attached to the housing main body 25 to be movable forward or backward relative to the housing main body 25. The valve plate 26 is disposed to be movable in a direction of expansion or contraction of the positive-pressure spring 34 integrally with the pedestal plate 40 or in accordance with the forward or backward movement of the pedestal plate 40. The negative-pressure relief valve 21 opens the second valve port 32 when the pressure in the pressure chamber 18 decreases to the pressure that is equal to or lower than the valve-opening pressure on the negative-pressure side. The positive valve-opening pressure adjustment unit 22 is configured to adjust the valve-opening pressure of the positive-pressure relief valve 20. When the positive-pressure relief valve 20 is closed, the positive valve-opening pressure adjustment unit 22 adjusts a set load of the positive-pressure spring 34 via the valve plate 26 through the forward or backward movement of the pedestal plate 40 relative to the housing main body 25. The negative valve-opening pressure adjustment unit 23 is configured to adjust the valve-opening pressure of the negative-pressure relief valve 21 and includes an adjustment screw 41 which is screw-joined to the pedestal plate 40. When the negative-pressure relief valve 21 is closed, the negative valve-opening pressure adjustment unit 23 adjusts a set load of the negative-pressure spring 37 according to an amount of the adjustment screw 41 screwed in the pedestal plate 40.

Accordingly, adjustments of the positive valve-opening pressure and the negative valve-opening pressure can be made from the pedestal plate 40-side. As a result, in the relief valve device 1 including the positive-pressure relief valve 20 and the negative-pressure relief valve 21, adjustment operations of the valve-opening pressures of the relief valves 20, 21 can be made easier.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:
1. A relief valve device comprising:
a housing that includes:
   a pressure chamber which communicates with a pressure container;
   a housing main body which opens on its one end side;

a valve plate that is disposed in the housing main body to define one side of the pressure chamber and that includes a first valve port and a second valve port, which communicate with the pressure chamber; and
a pedestal plate which is disposed further on the one end side of the housing main body than the valve plate;
a positive-pressure relief valve configured to open when pressure in the pressure chamber increases to a pressure that is equal to or higher than a valve-opening pressure on a positive-pressure side, wherein:
the positive-pressure relief valve is disposed on an opposite side of the valve plate from the pressure chamber;
the positive-pressure relief valve includes a positive-pressure spring that is configured to set the valve-opening pressure on the positive-pressure side; and
the positive-pressure relief valve opens the first valve port when the pressure in the pressure chamber increases to the pressure that is equal to or higher than the valve-opening pressure on the positive-pressure side;
a negative-pressure relief valve configured to open when the pressure in the pressure chamber decreases to a pressure that is equal to or lower than a valve-opening pressure on a negative-pressure side, wherein:
the negative-pressure relief valve is disposed on the pressure chamber-side of the valve plate;
the negative-pressure relief valve includes a negative-pressure spring that is configured to set the valve-opening pressure on the negative-pressure side;
the pedestal plate is attached to the housing main body to be movable forward or backward relative to the housing main body;
the valve plate is disposed to be movable in a direction of expansion or contraction of the negative-pressure spring integrally with the pedestal plate or in accordance with the forward or backward movement of the pedestal plate; and
the negative-pressure relief valve opens the second valve port when the pressure in the pressure chamber decreases to the pressure that is equal to or lower than the valve-opening pressure on the negative-pressure side;
a positive valve-opening pressure adjustment unit that is configured to adjust the valve-opening pressure of the positive-pressure relief valve and that includes an adjustment screw which is screw-joined to the pedestal plate, wherein when the positive-pressure relief valve is closed, the positive valve-opening pressure adjustment unit adjusts a set load of the positive-pressure spring according to an amount of the adjustment screw screwed in the pedestal plate; and
a negative valve-opening pressure adjustment unit that is configured to adjust the valve-opening pressure of the negative-pressure relief valve, wherein when the negative-pressure relief valve is closed, the negative valve-opening pressure adjustment unit adjusts a set load of the negative-pressure spring via the valve plate through the forward or backward movement of the pedestal plate relative to the housing main body.

2. The relief valve device according to claim 1, wherein:
the first valve port and the second valve port are configured as holes passing through the valve plate;
the positive-pressure relief valve further includes a first valving element that is configured to open or close the first valve port;
the first valving element is urged in a direction to close the first valve port by the positive-pressure spring;
the negative-pressure relief valve further includes a second valving element that is configured to open or close the second valve port; and
the second valving element is urged in a direction to close the second valve port by the negative-pressure spring.

3. The relief valve device according to claim 1, wherein:
the first valve port is configured as a hole passing through the valve plate;
the second valve port is configured as a clearance that is formed between an inner peripheral surface of the housing main body and an outer peripheral surface of the valve plate and that communicates with the pressure chamber;
the positive-pressure relief valve further includes a first valving element that is configured to open or close the first valve port;
the first valving element is urged in a direction to close the first valve port by the positive-pressure spring;
the negative-pressure relief valve is configured such that the valve plate functions as a second valving element which opens or closes the second valve port; and
the valve plate is urged in a direction to close the second valve port by the negative-pressure spring.

4. A relief valve device comprising:
a housing that includes:
a pressure chamber which communicates with a pressure container;
a housing main body which opens on its one end side;
a valve plate that is disposed in the housing main body to define one side of the pressure chamber and that includes a first valve port and a second valve port, which communicate with the pressure chamber; and
a pedestal plate which is disposed further on the one end side of the housing main body than the valve plate;
a positive-pressure relief valve configured to open when pressure in the pressure chamber increases to a pressure that is equal to or higher than a valve-opening pressure on a positive-pressure side, wherein:
the positive-pressure relief valve is disposed on an opposite side of the valve plate from the pressure chamber;
the positive-pressure relief valve includes a positive-pressure spring that is configured to set the valve-opening pressure on the positive-pressure side; and
the positive-pressure relief valve opens the first valve port when the pressure in the pressure chamber increases to the pressure that is equal to or higher than the valve-opening pressure on the positive-pressure side;
a negative-pressure relief valve configured to open when the pressure in the pressure chamber decreases to a pressure that is equal to or lower than a valve-opening pressure on a negative-pressure side, wherein:
the negative-pressure relief valve is disposed on the pressure chamber-side of the valve plate;
the negative-pressure relief valve includes a negative-pressure spring that is configured to set the valve-opening pressure on the negative-pressure side;
the pedestal plate is attached to the housing main body to be movable forward or backward relative to the housing main body;
the valve plate is disposed to be movable in a direction of expansion or contraction of the positive-pressure spring integrally with the pedestal plate or in accordance with the forward or backward movement of the pedestal plate; and
the negative-pressure relief valve opens the second valve port when the pressure in the pressure chamber decreases to the pressure that is equal to or lower than the valve-opening pressure on the negative-pressure side;

a positive valve-opening pressure adjustment unit that is configured to adjust the valve-opening pressure of the positive-pressure relief valve, wherein when the positive-pressure relief valve is closed, the positive valve-opening pressure adjustment unit adjusts a set load of the positive-pressure spring via the valve plate through the forward or backward movement of the pedestal plate relative to the housing main body; and a negative valve-opening pressure adjustment unit that is configured to adjust the valve-opening pressure of the negative-pressure relief valve and that includes an adjustment screw which is screw-joined to the pedestal plate, wherein when the negative-pressure relief valve is closed, the negative valve-opening pressure adjustment unit adjusts a set load of the negative-pressure spring according to an amount of the adjustment screw screwed in the pedestal plate.

5. The relief valve device according to claim 4, wherein:

the first valve port and the second valve port are configured as holes passing through the valve plate;

the positive-pressure relief valve further includes a first valving element that is configured to open or close the first valve port;

the first valving element is urged in a direction to close the first valve port by the positive-pressure spring;

the negative-pressure relief valve further includes a second valving element that is configured to open or close the second valve port; and the second valving element is urged in a direction to close the second valve port by the negative-pressure spring.

6. The relief valve device according to claim 4, wherein:

the first valve port is configured as a clearance that is formed between an inner peripheral surface of the housing main body and an outer peripheral surface of the valve plate and that communicates with the pressure chamber;

the second valve port is configured as a hole passing through the valve plate;

the positive-pressure relief valve is configured such that the valve plate functions as a first valving element which opens or closes the first valve port;

the valve plate is urged in a direction to close the first valve port by the positive-pressure spring;

the negative-pressure relief valve further includes a second valving element that is configured to open or close the second valve port; and the second valving element is urged in a direction to close the second valve port by the negative-pressure spring.

* * * * *